United States Patent [19]

Berry

[11] Patent Number: 5,055,724
[45] Date of Patent: Oct. 8, 1991

[54] OPEN-CYCLE MAGNETOHYDRODYNAMIC POWER PLANT WITH CO₂ RECYCLING

[75] Inventor: Gregory F. Berry, Naperville, Ill.

[73] Assignee: United States Department of Energy, Washington, D.C.

[21] Appl. No.: 428,676

[22] Filed: Oct. 30, 1989

[51] Int. Cl.⁵ .......................................... H02K 44/08
[52] U.S. Cl. ..................................................... 310/11
[58] Field of Search ........................................... 310/11

[56] References Cited

U.S. PATENT DOCUMENTS

| | | | |
|---|---|---|---|
| 3,895,243 | 7/1975 | Amend et al. | 310/11 |
| 4,107,557 | 8/1978 | Shepherd | 310/11 |
| 4,345,173 | 8/1982 | Marchant et al. | 310/11 |
| 4,718,361 | 1/1988 | Berry | 110/345 |

OTHER PUBLICATIONS

U.S. Sir No. H410 to Berry et al. issued 1/1988.
ANL/EES-TM-365, "An Open-Cycle Magnetohydrodynamic Power Plant with CO₂ Recycling" by Greg Berry, Feb., 1989.

Primary Examiner—Steven L. Stephan
Assistant Examiner—Judson H. Jones
Attorney, Agent, or Firm—Hugh W. Glenn; Robert J. Fisher; William R. Moser

[57] ABSTRACT

A method of converting the chemical energy of fossil fuel to electrical and mechanical energy with a MHD generator. The fossil fuel is mixed with preheated oxygen and carbon dioxide and a conducting seed of potassium carbonate to form a combustive and electrically conductive mixture which is burned in a combustion chamber. The burned combustion mixture is passed through a MHD generator to generate electrical energy. The burned combustion mixture is passed through a diffuser to restore the mixture approximately to atmospheric pressure, leaving a spent combustion mixture which is used to heat oxygen from an air separation plant and recycled carbon dioxide for combustion in a high temperature oxygen preheater and for heating water/steam for producing superheated steam. Relatively pure carbon dioxide is separated from the spent combustion mixture for further purification or for exhaust, while the remainder of the carbon dioxide is recycled from the spent combustion mixture to a carbon dioxide purification plant for removal of water and any nitrous oxides present, leaving a greater than 98% pure carbon dioxide. A portion of the greater then 98% pure carbon dioxide stream is recovered and the remainder is recycled to combine with the oxygen for preheating and combination with the fossil fuel to form a combustion mixture.

6 Claims, 3 Drawing Sheets

OPEN-CYCLE MAGNETOHYDRODYNAMIC POWER PLANT WITH $CO_2$ RECYCLING

CONTRACTUAL ORIGIN OF THE INVENTION

The U.S. Government has rights in this invention pursuant to Contract No. W-31-109-Eng-38 between the U.S. Department of Energy and The University of Chicago.

BACKGROUND OF THE INVENTION

The open-cycle magnetohydrodynamic (MHD) system for generating electrical power has been widely discussed as a possible means of improving fuel energy utilization. In the MHD system, a fuel such as coal is burned in a combustor to provide combustion gases at such high temperatures (2500° K. to 2750° K.) that a plasma is generated. The plasma is seeded with an electrically conductive material, such as a potassium compound like potassium carbonate ($K_2CO_3$) to increase the electrical conductivity of the gases. This high-temperature electrically-conductive plasma has pressures of approximately 4-9 atmospheres. The plasma accelerated then into a high linear velocity (0.7 to 2.0 Mach), for example, for passing through an opened ended circumferentially walled MHD channel. Superconductive magnets outside the channel direct high levels of magnetic flux crosswise through and along the channel. The electrically-conductive gases rapidly transverse the magnetic flux and thereby induce on the channel walls parallel to the flux a DC potential that is directly proportional to the conductivity and the speed of the gases and to the square of the magnetic flux, and that is inversely proportional to the pressure of the gases. This DC power in turn is converted to AC power by an inverter or the like for normal transmission to end users.

The combustion gases discharged from the MHD channel will be at temperatures generally exceeding 2000° K. and probably even as high as 2200° K. and at velocities generally exceeding 0.8 to 1.6 Mach. A diffuser is used to convert the kinetic energy into thermal energy by recovering the pressure to atmospheric or slightly higher. Such MHD systems have been disclosed in the Marchant U.S. Pat. No. 4,345,173 issued Aug. 17, 1982 and the Berry et al. U.S. registration no. H410 published Jan. 5, 1988, the disclosures of this patent and statutory invention registration being incorporated herein.

One of the problems encountered in the MHD systems is the exhaust of various gases which are deleterious to the environment. Sulfur oxides, nitrogen oxides as well as carbon dioxide are vented in varying concentrations and each of these gases provide some detriment to the environment. The nitrogen and sulfur oxides contribute to acid rain while the carbon dioxide contributes to the so-called "green house effect".

SUMMARY OF THE INVENTION

This invention relates to an improved open-cycle MHD power generating system that eliminates some of the components previously used in MHD systems thereby reducing the complexity, cost and construction requirements of the systems and also reduces the carbonaceous gases vented to the atmosphere in prior MHD concepts and also provides a recoverable commercially viable carbon dioxide stream.

The invention relates to providing oxidizer stream of carbon dioxide and oxygen for burning coal in an MHD power generation system resulting in a principal gaseous product of approximately 92% carbon dioxide, 5% steam and 3% oxygen permitting the recovery of a relatively high purity carbon dioxide stream with negligible nitrogen and sulfur oxides.

Accordingly, it is an object of this invention to provide an improved MHD generating system which permits lower capital costs due to reduced size of the steam generation equipment along with elimination of equipment needed to control nitrogen oxides and by increasing the mass flow rate through the topping cycle increases the output of the topping cycle to mitigate the decreased performance due to lower plasma temperature. The production of a high purity $CO_2$ product is useful for the enhanced oil recovery techniques as well as being useful in both beverage carbonation and food preservation industries.

Another object of the invention is to provide a method of converting the chemical energy of fossil fuel to electrical and mechanical energy comprising: mixing the fossil fuel with preheated oxygen and carbon dioxide and a conducting seed of potassium carbonate to form a combustive and electrically conductive mixture, burning the combustive and electrically conducting mixture in a combustion chamber; passing the burned combustion mixture through a MHD generator to generate electrical energy; passing the burned combustion mixture through a diffuser to restore the mixture approximately to atmospheric pressure, leaving a spent combustion mixture; exchanging heat from the spent combustion mixture with oxygen from an air separation plant and recycled carbon dioxide for combustion in a high temperature oxygen preheater and with water/steam producing superheated steam; removing relatively pure carbon dioxide from the spent combustion mixture for further purification or for exhaust; recycling the remainder of the carbon dioxide from the spent combustion mixture to a carbon dioxide purification plant for removal of water and any nitrous oxides present, leaving a greater than 98% pure carbon dioxide; recovering a portion of the greater than 98% pure carbon dioxide stream and recycling the remainder to combine with the oxygen for preheating and combination with the fossil fuel, recycling the preheated oxygen and the carbon dioxide and the fossil fuel to form a combustion mixture.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
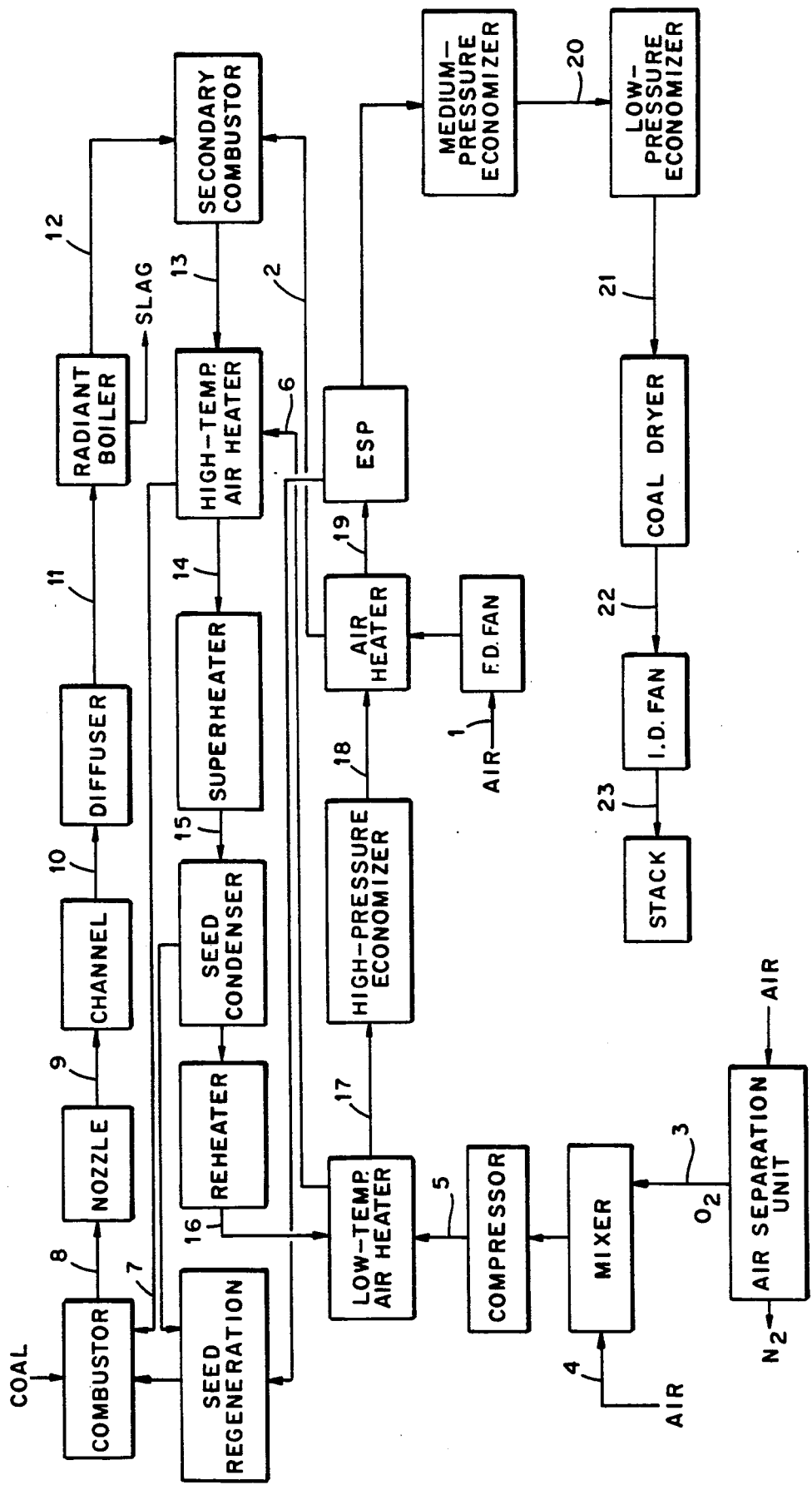
FIG. 1 is a block diagram of a base case MHD system.

FIG. 1 is a block diagram of a base case MHD system with the reference numbers indicating state points as set forth in Table 3.

The base case 425-MWt MHD system is a power plant fired on Illinois No. 6 coal. Its ASU produces an $O_2$ stream that is 70% pure by volume. The $O_2$ stream is combined with air to produce $O_2$-enriched air (35% by volume) that is heated to 1200° F. The steam plant is a 2400-psig/1000° F./1000° F. cycle. Topping-cycle parameters are as follows: compressor pressure=9 atm, magnetic field intensity=6 T, Faraday channel centerline load factor=0.85, primary stoichiometry=85%, and subsonic channel entrance velocity of this plant is 800 m/s.

There are two reasons for firing the topping cycle at a stoichiometry of 85%: (1) the highest plasma temperature is reached near that level and (2) the equilibrium value of NO at this fuel/oxidizer ratio and at a temperature near 1865 K ($NO_x$ freezing temperature) is well below requirements of the New Source Performance Standards. Theoretically, therefore, $NO_x$ in the combustion-products gas can be decomposed to low levels before secondary air is introduced to complete the combustion. The $NO_x$ decomposition requirements put a heavy burden on operation of the MHD power plant. Besides the aforementioned requirement of substoichiometric combustion, several other design requirements must be considered: (1) a short or near-adiabatic diffuser to minimize heat loss and thus provide sufficient temperature potential for decomposing $NO_x$ in the radiant boiler (a higher radiant boiler gas inlet temperature shortens the decomposition time because $NO_x$ decomposition is an exponential function of temperature), (2), a large and expensive refractory-lined (high-thermal-resistance) radiant boiler for cooling combustion-products gas slowly so that $NO_x$ can decompose toward the low equilibrium values ($NO_x$ decomposition is a slow process, having a cooling rate of 360 K/s and requiring approximately 2 s residence time), and (3) a refractory-lined $NO_x$ destruction furnace to protect the boiler tubes from attack by hydrogen sulfide in the substoichiometric sulfur-laden combustion-products gas.

These requirements introduce conflicting design constraints. First, to ensure the integrity of the refractory lining and boiler tube back wall, the particle-laden combustion-products gas must enter the boiler very slowly (100 m/s); otherwise, a high-velocity particle-laden jet will strike the boiler backwall, promoting both a local hot spot and a region of high erosion damage. The only effective way to prevent this damage is to use (1) a well-designed diffuser (one with a high pressure-recovery coefficient for increased generator performance) and (2) a subsequent spoiler to reduce the gas velocity to acceptable levels after most of the pressure has been recovered. Unfortunately, this concept requires a long diffuser/spoiler component, which increases heat transfer (unless an adiabatic diffuser concept is employed) and therefore increases the burden (an even slower cooling rate) on the radiant boiler, which translates into a more expensive boiler. Furthermore, MHD power plants produce excessive low-grade heat compared with conventional power plants. Accordingly, thermal management is an additional consideration.

FIG. 1 depicts all of the system components used in a systems simulation of the base case MHD power plant. The Systems Analysis Language Translator, or SALT, computer code has been used to predict the performance of this system (SALT is used to predict performance and economics for numerous energy conversion and/or power generation concepts). A parametric sweep, to investigate the effect of changes in the primary stoichiometry and $O_2$ concentration in the oxidizer stream, was made to assess the sensitivity of performance to $O_2$ requirements; results are reported in Table 1. The equilibrium value of NO produced at the flame temperature is approximately 10,000 ppm. It is believed that the actual value of generated $NO_x$ may be only about half of this value.

TABLE 1

Summary of Base Case MHD Performance

| Computer Run | Net Power Output (MW) | Power Demand (MW) MHD Generator | Power Demand (MW) Main Compressor | Efficiency (%) | $O_2$ (Vol. %) | Stoichiometry | Compressor Pressure (atm) | $O_2$ Flow Rate (kg/s) |
|---|---|---|---|---|---|---|---|---|
| 1 | 196.4 | 75.8 | 20.1 | 46.41 | 35 | 0.86 | 9.09 | 12.82 |
| 2 | 197.0 | 76.5 | 19.0 | 46.55 | 37 | 0.86 | 9.09 | 13.99 |
| 3 | 197.3 | 76.7 | 18.0 | 46.62 | 39 | 0.86 | 9.09 | 15.05 |
| 4 | 197.3 | 77.9 | 20.5 | 46.61 | 35 | 0.88 | 9.09 | 13.12 |
| 5 | 197.8 | 78.4 | 19.4 | 46.72 | 37 | 0.88 | 9.09 | 14.32 |
| 6 | 198.0 | 78.4 | 18.4 | 46.78 | 39 | 0.88 | 9.09 | 15.39 |
| 7 | 198.0 | 79.7 | 21.0 | 46.77 | 35 | 0.90 | 9.09 | 13.42 |
| 8 | 198.4 | 80.0 | 19.8 | 46.86 | 37 | 0.90 | 9.09 | 14.64 |
| 9 | 198.5 | 79.9 | 18.8 | 46.90 | 39 | 0.90 | 9.09 | 15.74 |
| 10 | 196.5 | 74.6 | 18.6 | 46.44 | 35 | 0.86 | 8.08 | 12.82 |
| 11 | 196.9 | 75.0 | 17.6 | 46.52 | 37 | 0.86 | 8.08 | 13.99 |
| 12 | 197.0 | 74.9 | 16.7 | 46.55 | 39 | 0.86 | 8.08 | 15.05 |
| 13 | 197.3 | 76.5 | 19.1 | 46.62 | 35 | 0.88 | 8.08 | 13.12 |
| 14 | 197.6 | 76.9 | 18.0 | 46.68 | 37 | 0.88 | 8.08 | 14.32 |
| 15 | 197.7 | 76.5 | 17.1 | 46.70 | 39 | 0.88 | 8.08 | 15.39 |
| 16 | 197.9 | 78.1 | 19.5 | 46.76 | 35 | 0.90 | 8.08 | 13.42 |
| 17 | 198.1 | 78.2 | 18.5 | 46.81 | 37 | 0.90 | 8.08 | 14.64 |
| 18 | 198.2 | 77.9 | 17.5 | 46.82 | 39 | 0.90 | 8.08 | 15.74 |
| 19 | 196.3 | 72.6 | 13.7 | 46.37 | 35 | 0.86 | 7.07 | 12.82 |
| 20 | 196.4 | 72.7 | 16.2 | 46.41 | 37 | 0.86 | 7.07 | 13.99 |
| 21 | 196.4 | 72.4 | 13.7 | 46.40 | 39 | 0.86 | 7.07 | 15.05 |
| 22 | 197.0 | 74.3 | 17.5 | 46.54 | 35 | 0.88 | 7.07 | 13.12 |
| 23 | 197.0 | 74.2 | 16.6 | 46.55 | 37 | 0.88 | 7.07 | 14.32 |
| 24 | 196.9 | 73.8 | 15.7 | 46.53 | 39 | 0.88 | 7.07 | 15.39 |

TABLE 1-continued

| | | Summary of Base Case MHD Performance | | | | | | |
|---|---|---|---|---|---|---|---|---|
| | Net Power | Power Demand (MW) | | Effi- | $O_2$ | | Compressor | $O_2$ |
| Computer | Output | MHD | Main | ciency | (Vol. | Stoichio- | Pressure | Flow Rate |
| Run | (MW) | Generator | Compressor | (%) | %) | metry | (atm) | (kg/s) |
| 25 | 197.6 | 75.8 | 17.9 | 46.67 | 35 | 0.90 | 7.07 | 13.42 |
| 26 | 197.6 | 75.6 | 16.9 | 46.67 | 37 | 0.90 | 7.07 | 14.64 |
| 27 | 197.4 | 75.1 | 16.1 | 46.63 | 39 | 0.90 | 7.07 | 14.74 |

Figure 2:
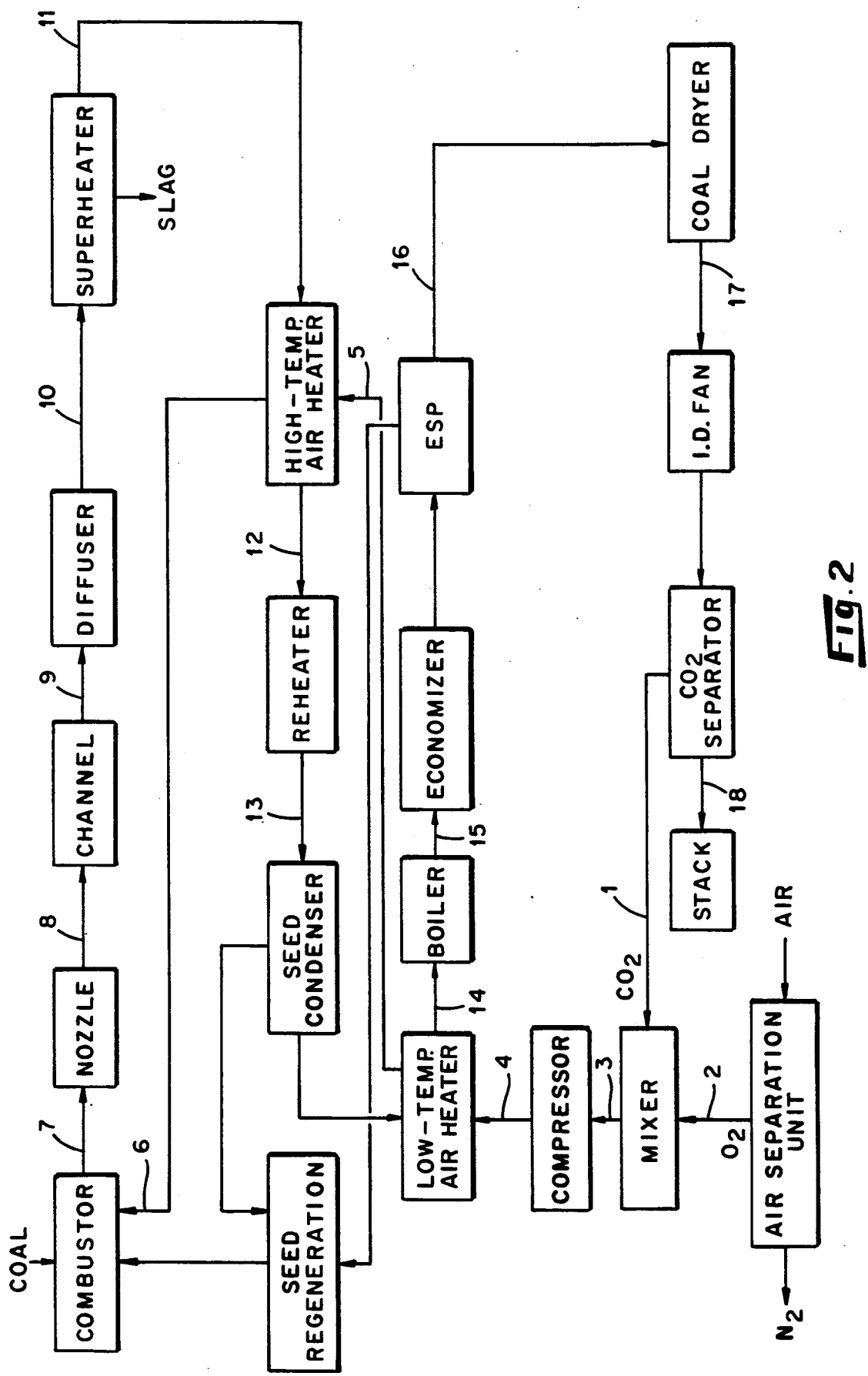
FIG. 2 is a block diagram of a $CO_2$ MHD system.

The configuration of the $CO_2$ MHD concept is depicted in FIG. 2. Differences between this configuration and that of the base case are as follows: (1) secondary combustion is no longer needed because the original combustion occurs with excess $O_2$, (2) the refractory-lined radiant boiler is replaced by a conventional boiler, (3) $CO_2$ recycle ducting is required, (4) a small $CO_2$ separation unit is required for $CO_2$ recycling, and (5) gas enters the channel at 700 m/s (to duplicate the inlet Mach number of the base case system).

The results from the parameter sweeps are presented in Table 2. The equilibrium value of NO is approximately 1000 ppm, while that of $NO_x$ is negligible at lower temperatures (below 2000° K.). Since these values are all from fuel-bound nitrogen, it is believed that the actual value of NO produced is about 40% of this calculated value. Hence, NO decomposition should not be a major concern. The nominal efficiency of this system is approximately 43.5% (a decline of 3% from the base case MHD calculation). All cases are for 425 MWt input.

Tables 3 and 4 list state-point data for the base case and $CO_2$ MHD concepts, respectively. Table 5 lists relative generator information.

TABLE 2

| | | Summary of $CO_2$ MHD Performance | | | | | | | |
|---|---|---|---|---|---|---|---|---|---|
| | Net Power | Power Demand (MW) | | Effi- | $O_2$ | | Compressor | Flow Rate | |
| Computer | Output | MHD | Main | ciency | (Vol. | Stoichio- | Pressure | (kg/s) | |
| Run | (MW) | Generator | Compressor | (%) | %) | metry | (atm) | $CO_2$ | $O_2$ |
| 28 | 182.5 | 60.7 | 19.3 | 43.12 | 50 | 1.05 | 9.09 | 45.21 | 32.87 |
| 29 | 185.1 | 63.6 | 17.3 | 43.73 | 55 | 1.05 | 9.09 | 36.99 | 32.87 |
| 30 | 186.9 | 65.5 | 15.7 | 44.16 | 60 | 1.05 | 9.09 | 30.14 | 32.87 |
| 31 | 188.3 | 66.7 | 14.4 | 44.23 | 65 | 1.05 | 9.09 | 24.34 | 32.87 |
| 32 | 181.9 | 61.0 | 19.8 | 42.97 | 50 | 1.08 | 9.09 | 46.50 | 33.81 |
| 33 | 184.6 | 64.1 | 17.8 | 43.61 | 55 | 1.08 | 9.09 | 38.04 | 33.81 |
| 34 | 186.5 | 66.2 | 16.2 | 44.07 | 60 | 1.08 | 9.09 | 31.00 | 33.81 |
| 35 | 187.9 | 67.4 | 14.8 | 44.53 | 65 | 1.08 | 9.09 | 25.94 | 33.81 |
| 36 | 181.2 | 61.2 | 20.4 | 42.82 | 50 | 1.11 | 9.09 | 47.79 | 34.75 |
| 37 | 184.1 | 64.6 | 18.3 | 43.49 | 55 | 1.11 | 9.09 | 39.10 | 34.75 |
| 38 | 186.1 | 66.7 | 16.6 | 43.97 | 60 | 1.11 | 9.09 | 31.86 | 34.75 |
| 39 | 187.6 | 68.1 | 15.2 | 44.32 | 65 | 1.11 | 9.09 | 25.73 | 34.75 |
| 40 | 182.7 | 59.7 | 18.0 | 43.16 | 50 | 1.05 | 8.08 | 45.21 | 32.87 |
| 41 | 185.0 | 62.2 | 16.2 | 43.70 | 55 | 1.05 | 8.08 | 36.99 | 32.87 |
| 42 | 186.5 | 63.8 | 14.7 | 44.07 | 60 | 1.05 | 8.08 | 30.14 | 32.87 |
| 43 | 187.7 | 64.7 | 13.4 | 44.09 | 65 | 1.05 | 8.08 | 24.34 | 32.87 |
| 44 | 182.1 | 60.1 | 18.5 | 43.02 | 50 | 1.08 | 8.08 | 46.50 | 33.81 |
| 45 | 184.5 | 62.8 | 16.6 | 43.59 | 55 | 1.08 | 8.08 | 38.04 | 33.81 |
| 46 | 186.2 | 64.5 | 15.1 | 43.99 | 60 | 1.08 | 8.08 | 31.00 | 33.81 |
| 47 | 187.4 | 65.4 | 13.8 | 44.40 | 65 | 1.08 | 8.08 | 25.04 | 33.81 |
| 48 | 181.5 | 60.4 | 19.0 | 42.88 | 50 | 1.11 | 8.08 | 47.79 | 34.75 |
| 49 | 184.0 | 63.2 | 17.1 | 43.48 | 55 | 1.11 | 8.08 | 39.10 | 34.75 |
| 50 | 185.8 | 65.0 | 15.5 | 43.89 | 60 | 1.11 | 8.08 | 31.86 | 34.75 |
| 51 | 187.0 | 66.2 | 14.2 | 44.19 | 65 | 1.11 | 8.08 | 25.73 | 34.75 |
| 52 | 182.6 | 58.2 | 16.6 | 43.14 | 50 | 1.05 | 7.07 | 45.21 | 32.87 |
| 53 | 184.5 | 60.2 | 14.9 | 43.60 | 55 | 1.05 | 7.07 | 36.99 | 32.87 |
| 54 | 185.9 | 61.4 | 13.5 | 43.91 | 60 | 1.05 | 7.07 | 30.14 | 32.87 |
| 55 | 186.8 | 62.1 | 12.4 | 43.88 | 65 | 1.05 | 7.07 | 24.34 | 32.87 |
| 56 | 182.1 | 58.6 | 17.0 | 43.02 | 50 | 1.08 | 7.07 | 46.50 | 33.81 |
| 57 | 184.1 | 60.8 | 15.3 | 43.50 | 55 | 1.08 | 7.07 | 38.04 | 33.81 |
| 58 | 185.5 | 62.1 | 13.9 | 43.83 | 60 | 1.08 | 7.07 | 31.00 | 33.81 |
| 59 | 186.5 | 62.8 | 12.7 | 44.19 | 65 | 1.08 | 7.07 | 25.04 | 33.81 |
| 60 | 181.5 | 58.9 | 17.5 | 42.89 | 50 | 1.11 | 7.07 | 47.79 | 34.75 |
| 61 | 183.7 | 61.3 | 15.8 | 43.39 | 55 | 1.11 | 7.07 | 39.10 | 34.75 |
| 62 | 185.2 | 62.7 | 14.3 | 43.74 | 60 | 1.11 | 7.07 | 31.86 | 34.75 |
| 63 | 186.2 | 63.5 | 13.1 | 43.98 | 65 | 1.11 | 7.07 | 25.73 | 34.75 |

TABLE 3

| | State-Point Data for Three Computer Runs, Base Case MHD | | | | | | | | |
|---|---|---|---|---|---|---|---|---|---|
| | Run 1 | | | Run 10 | | | Run 19 | | |
| State Point | Pressure (atm) | Temp. (K.) | Flow Rate (kg/s) | Pressure (atm) | Temp. (K.) | Flow Rate (kg/s) | Pressure (atm) | Temp. (K.) | Flow Rate (kg/s) |
| 1 | 1.000 | 298 | 24.4 | — | — | —[a] | — | — | — |
| 2 | 1.039 | 450 | 24.4 | — | — | — | — | — | — |
| 3 | 1.000 | 298 | 12.8 | — | — | — | — | — | — |
| 4 | 1.000 | 298 | 57.9 | — | — | — | — | — | — |

TABLE 3-continued

State-Point Data for Three Computer Runs, Base Case MHD

| | Run 1 | | | Run 10 | | | Run 19 | | |
|---|---|---|---|---|---|---|---|---|---|
| State Point | Pressure (atm) | Temp. (K.) | Flow Rate (kg/s) | Pressure (atm) | Temp. (K.) | Flow Rate (kg/s) | Pressure (atm) | Temp. (K.) | Flow Rate (kg/s) |
| 5  | 9.090 | 578  | 70.7  | 8.080 | 559  | — | 7.070 | 538  | — |
| 6  | 8.954 | 735  | 70.7  | 7.959 | —    | — | 6.964 | —    | — |
| 7  | 8.919 | 922  | 70.7  | 7.839 | —    | — | 6.859 | —    | — |
| 8  | 8.919 | 2854 | 86.2  | 7.839 | 2845 | — | 6.859 | 2835 | — |
| 9  | 5.842 | 2739 | 86.2  | 5.188 | 2731 | — | 4.535 | 2722 | — |
| 10 | 0.710 | 2263 | 86.2  | 0.710 | 2282 | — | 0.710 | 2305 | — |
| 11 | 1.008 | 2404 | 86.2  | 1.005 | 2419 | — | 1.001 | 2436 | — |
| 12 | 0.998 | 1865 | 86.1  | 0.995 | —    | — | 0.991 | —    | — |
| 13 | 0.998 | 2043 | 110.5 | 0.995 | —    | — | 0.991 | —    | — |
| 14 | 0.988 | 1969 | 110.5 | 0.985 | —    | — | 0.981 | —    | — |
| 15 | 0.978 | 1321 | 110.5 | 0.975 | —    | — | 0.972 | —    | — |
| 16 | 0.968 | 985  | 108.7 | 0.965 | 984  | — | 0.962 | 983  | — |
| 17 | 0.958 | 897  | 108.7 | 0.956 | 887  | — | 0.952 | 874  | — |
| 18 | 0.949 | 775  | 108.7 | 0.946 | 769  | — | 0.943 | 761  | — |
| 19 | 0.939 | 746  | 108.7 | 0.937 | 740  | — | 0.933 | 733  | — |
| 20 | 0.930 | 655  | 107.6 | 0.927 | —    | — | 0.924 | —    | — |
| 21 | 0.921 | 428  | 107.6 | 0.918 | 427  | — | 0.915 | —    | — |
| 22 | 0.921 | 386  | 108.8 | 0.918 | —    | — | 0.915 | —    | — |
| 23 | 1.020 | 400  | 108.8 | —     | —    | — | —     | —    | — |

$^a$Dash indicates no change from previous run.

TABLE 4

State-Point Data for Three Computer Runs, CO$_2$ MHD

| | Run 28 | | | Run 40 | | | Run 52 | | |
|---|---|---|---|---|---|---|---|---|---|
| State Point | Pressure (atm) | Temp. (K.) | Flow Rate (kg/s) | Pressure (atm) | Temp. (K.) | Flow Rate (kg/s) | Pressure (atm) | Temp. (K.) | Flow Rate (kg/s) |
| 1  | 1.020 | 400  | 45.2 | —     | —    | — | —     | —    | — |
| 2  | 1.000 | 298  | 32.9 | —     | —    | — | —     | —    | — |
| 3  | 1.000 | 357  | 78.1 | —     | —    | — | —     | —    | — |
| 4  | 9.090 | 607  | 78.1 | 8.080 | 592  | — | 7.070 | 574  | — |
| 5  | 8.954 | 735  | 78.1 | 7.959 | —    | — | 6.964 | —    | — |
| 6  | 8.819 | 922  | 78.1 | 7.839 | —    | — | 6.859 | —    | — |
| 7  | 8.819 | 2759 | 93.5 | 7.839 | 2749 | — | 6.859 | 2738 | — |
| 8  | 5.905 | 2678 | 93.5 | 5.244 | 2669 | — | 4.584 | 2659 | — |
| 9  | 0.730 | 2349 | 93.5 | 0.730 | 2359 | — | 0.730 | 2369 | — |
| 10 | 1.009 | 2420 | 93.5 | 1.007 | 2429 | — | 1.005 | 2438 | — |
| 11 | 0.999 | 2048 | 93.4 | 0.997 | 2067 | — | 0.995 | 2087 | — |
| 12 | 0.989 | 1967 | 93.4 | 0.987 | 1988 | — | 0.985 | 2011 | — |
| 13 | 0.979 | 1649 | 93.4 | 0.977 | 1679 | — | 0.975 | 1712 | — |
| 14 | 0.969 | 1570 | 91.7 | 0.967 | 1591 | — | 0.965 | 1615 | — |
| 15 | 0.959 | 648  | 91.7 | 0.958 | —    | — | 0.955 | —    | — |
| 16 | 0.950 | 443  | 90.6 | 0.948 | —    | — | 0.946 | —    | — |
| 17 | 0.950 | 392  | 91.7 | 0.948 | —    | — | 0.946 | —    | — |
| 18 | 1.020 | 400  | 46.5 | —     | —    | — | —     | —    | — |

$^a$Dash indicates no changes from previous run.

TABLE 5

Channel Parameters for the Two Systems (data from six computer runs)

| | Computer Run | | | | | |
|---|---|---|---|---|---|---|
| Parameter | 1 | 10 | 19 | 28 | 40 | 52 |
| Mach No. | | | | | | |
| Inlet | 0.82 | 0.82 | 0.82 | 0.83 | 0.83 | 0.83 |
| Outlet | 0.91 | 0.91 | 0.90 | 0.90 | 0.90 | 0.89 |
| Faraday Field (kV/m) | 4.1 | 4.1 | 4.1 | 3.6 | 3.6 | 3.6 |
| Faraday Current (kA/m$^2$) | 4.7 | 5.1 | 5.6 | 3.9 | 4.1 | 4.3 |
| Hall Field (kV/m) | 1.3 | 1.4 | 1.5 | 1.0 | 1.1 | 1.2 |
| Maximum Hall Parameter | 4.9 | 4.9 | 4.9 | 4.4 | 4.4 | 4.4 |
| Heat Loss (%) | 22 | 19 | 16 | 37 | 32 | 28 |
| Frictional Pressure Drop (%) | 28 | 24 | 21 | 35 | 31 | 27 |
| Conductivity (S/m) | | | | | | |
| Inlet | 11.1 | 11.6 | 12.1 | 7.3 | 7.6 | 8.0 |
| Average | 6.6 | 7.1 | 7.7 | 6.2 | 6.5 | 6.9 |
| Area (m$^2$) | | | | | | |
| Inlet | 0.14 | 0.16 | 0.18 | 0.13 | 0.15 | 0.17 |
| Outlet | 0.93 | 0.94 | 0.95 | 0.93 | 0.94 | 0.94 |
| Length (m) | 10.3 | 9.0 | 7.6 | 12.8 | 11.3 | 9.8 |
| Enthalpy Extraction (%) | 22.0 | 21.6 | 21.1 | 14.9 | 14.7 | 14.3 |

Comparing the new CO$_2$/O$_2$ oxidizer of FIG. 2 to the base case of FIG. 1, it is noted that (1) efficiency declines, (2) channel sizes are larger, (3) ASU is larger, (4) flue gas mass flow rate and volumetric flow rates are lower, (5) efficiency is more sensitive to variations in oxygen concentration in the oxidizer stream and less sensitive to the combustion stoichiometry, and (6) NO equilibrium values, at flame temperatures, are approximately an order of magnitude lower. Each of these observations has ramifications with respect to the economic viability of the present invention CO$_2$ MHD process. Those ramifications, as well as the physical explanations of these observations follow.

The efficiency decline was expected and is due to reduced topping-cycle performance. The gas mass flow rate through the channel is lower, as is the entrance electrical conductivity of the plasma. Reduced electrical conductivity is directly related to the lower plasma temperature and to differences between the specific heats of $CO_2$ and $N_2$. It is believed that improvements in system economics will offset this loss of efficiency.

The channel is longer in the $CO_2$ embodiment or process because the lower electrical conductivity translates into lower power density. Inlet Mach numbers and inlet flow areas were nearly the same in both systems; the magnet will be slightly longer in the $CO_2$ embodiment. The net effect of the size change should yield a minor increase in topping-cycle cost. The analysis was performed using a one-dimensional channel model (as part of the system simulation); therefore, it is premature to interpret the results of the topping cycle beyond an initial comparison.

More $O_2$ is needed in the present invention because in the base case a significant fraction of the $O_2$ is supplied by the unenriched air ($O_2$ from the ASU is used only for enrichment). Therefore, the ASU must be much larger. To compare the relative amounts of $O_2$ from the ASU, the analysis assumes that a 100% pure $O_2$ product stream is generated (instead of the actual 70% $O_2$ purity stream). No value is given the $N_2$ product stream, and it is not considered in the analysis. For a quantitative economic comparison, the actual 70% purity stream would be required in the simulation. Because system economics are discussed only qualitatively, a more accurate result was not considered necessary. The $O_2$ flow rate for the base case MHD system is 13–16 kg/s (see Table 1); that for the $CO_2$ MHD inventive system is 33–35 kg/s (Table 2).

The flue gas mass flow rate in the $CO_2$ MHD embodiment is much lower than in the base case. In concert with the differences between the desities of $CO_2$ and $N_2$ ($CO_2$ is denser than $N_2$), this yields a much lower volumetric flue gas flow rate and therefore, much smaller heat exchanges. Together with the lower boiler cost (elimination of the need for a slow cooling rate under substoichiometric conditions for $NO_x$ decomposition), this suggests significant cost savings for steam generation. An approximate reduction of 60% in heat-transfer surface area is expected for the steam generator. Numerous cost studies for base case MHD designs have demonstrated higher costs for steam generation equipment relative to the same steam generator capacity in conventional coal-fired systems. Most of this cost increase is associated with problems of $NO_x$ decomposition and handling of the condensed seed. Hence, the finding of much lower bottoming-cycle costs for the present $CO_2$ MHD invention may be significant.

Figure 3:
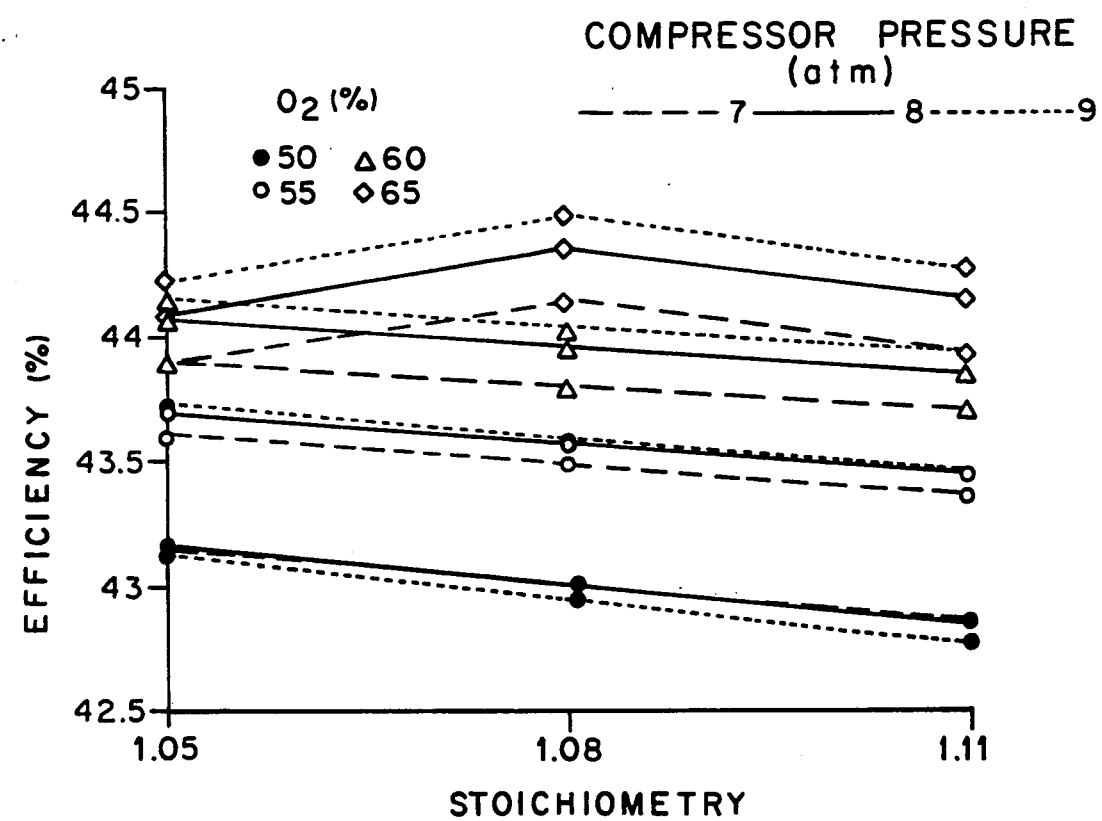
FIG. 3 is a graph showing the relationship between MHD efficiency relative to $O_2$ concentration and stoichiometry.

The relative increase in efficiency with respect to variations in $O_2$ concentration and stoichiometry for the $CO_2$ MHD embodiment was not expected and presently cannot be explained; results for three pressures (7, 8, and 9 atm) are shown in FIG. 3). At this point, it is considered advantageous because a higher $O_2$ concentration can be used in the oxidizer. It is believed that a higher $O_2$ concentration (a lower value of $CO_2$ recycling used for the same amount of $O_2$ required to meet stoichiometry requirements) may yield significantly reduced costs associated with less recycling and even lower bottoming-cycle costs. This is shown in Table 2; note that $O_2$ flow rate does not vary with $O_2$ concentration but only with stoichiometry. The efficiency variation with respect to stoichiometry was almost the same as for the base case system. Variation with respect to compressor pressure was greater in the present $CO_2$ invention.

Formation of $NO_x$ occurs by one of three mechanisms. Thermal $NO_x$ is basically formed at high temperatures by the dissociation of $N_2$ and $O_2$ and the combination of N and O atoms to form $NO_x$ compounds. Estimates of thermal $NO_x$ formation at the flame temperature are in the range of 80% of the equilibrium value for base case MHD power plants. Prompt $NO_x$ is formed from $N_2$ in the air at low temperatures. For the $CO_2$ MHD embodiment, the absence of $N_2$ in the oxidizer drastically diminishes the propensity for either thermal or prompt $NO_x$ to form. In the third mechanism, $NO_x$ compounds can result from fuel-bound nitrogen released during combustion. The rate of release is roughly proportional linearly to the burning rate of the coal particle. The released nitrogen either escapes as a gas or combines with other elements to form nitrogen compounds; $NO_x$ compounds are preferential and readily formed. Fuel-bound nitrogen that forms $NO_x$ is estimated to be roughly 40–80% of the computed equilibrium values that forms $NO_x$ is estimated to be roughly 40–80% of the computed equilibrium values. For the $CO_2$ MHD embodiment, the equilibrium value of $NO_x$ is lower because of the lower availability of nitrogen. Equilibrium values of $NO_x$ rapidly decrease as the temperature drops. Presently, $NO_x$ is not believed to be a concern for the $CO_2$ MHD embodiment.

$CO_2$ is used in enhanced oil recovery (EOR) and extensively in the food processing industry for freezing and carbonation. Natural supplies of $CO_2$ are limited and available only in specific locations. $CO_2$ can be produced by separating it from other combustion products produced by burning a clean fossil fuel (oil, gas, clean coal, or scrubbed flue gas). The Dow monoethanolamine (MEA) process has been removed from the commercial market. Feed stream values of $NO_x$ and $SO_x$ must be very low, otherwise the costs associated with both solvent losses and energy requirements would be unacceptable. For the $CO_2$ MHD embodiment, quantities of both $NO_x$ and $SO_x$ will be lower than for the base case MHD concept and much lower than for a conventional coal-fired power plant. The cost of extracting $CO_2$ from a stream consisting of approximately 15% $CO_2$ is comparable to the cost of producing high-purity $O_2$ to burn coal with a $CO_2/O_2$ oxidizer and then extracting $CO_2$ from the ensuing combustion-products stream that contains approximately 95% $CO_2$.

The $CO_2$ MHD embodiment is a viable alternative to the base case $O_2$-enriched MHD concept. When combined with a saleable $CO_2$ product, it is especially attractive. The driving force behind economic viability will ultimately be the cost of $CO_2$ production relative to that of competing methods.

The new invention may be simpler, especially in the elimination of NOx problems and interface issues (e.g. diffuser design) relative to the need to comply with the New Source Performance Standards and $NO_x$ emissions. Favorable economics (sharply reduced bottoming-cycle costs and modestly increased ASU and topping-cycle costs) should compensate for the approximate 3% loss in efficiency. Increased concern relative to mitigating the greenhouse effect may ultimately generate even more interest in this concept.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of converting the chemical energy of fossil fuel to electrical and mechanical energy comprising: mixing the fossil fuel with preheated oxygen and carbon dioxide and a conducting seed of potassium carbonate to form a combustive and electrically conductive mixture, burning the combustive and electrically conducting mixture in a combustion chamber; passing the burned combustion mixture through a MHD generator to generate electrical energy; passing the burned combustion mixture through a diffuser to restore the mixture approximately to atmospheric pressure, leaving a spent combustion mixture; exchanging heat from the spent combustion mixture with oxygen from an air separation plant and recycled carbon dioxide for combustion in a high temperature oxygen preheater; removing relatively pure carbon dioxide from the spent combustion mixture for further purification or for exhaust; recycling the remainder of the carbon dioxide from the spent combustion mixture to a carbon dioxide purification plant for removal of water and any nitrous oxides present, leaving a greater than 98% pure carbon dioxide; recovering a portion of the greater than 98% pure carbon dioxide stream and recycling the remainder to combine with the oxygen for preheating and combination with the fossil fuel, recycling the preheated oxygen and the carbon dioxide and the fossil fuel to form a combustion mixture.

2. The method of claim 1, wherein the heat from the spent combustion mixture leaving the MHD diffuser is used to produce steam to produce power.

3. The method of claim 1, wherein substantially all of the $CO_2$ is recovered for resale to prevent exhausting the $CO_2$ to the atmosphere.

4. The method of claim 1, and further comprising removing potassium sulfate and ash from the spent combustion gases to a seed reprocess plant producing potassium carbonate, leaving ash and sulfur, and recycling potassium carbonate to combine with the preheated oxygen and the carbon dioxide and the fossil fuel to form a combustion mixture.

5. The method of claim 1, wherein the associated steam cycle equipment is small due to reduced lower volumetric flue gas rate.

6. The method of claim 1, wherein the off gas to the atmosphere is substantially free of nitrogen oxides.

* * * * *